United States Patent
Iwamoto et al.

(10) Patent No.: US 11,981,100 B2
(45) Date of Patent: May 14, 2024

(54) TIRE VULCANIZATION SYSTEM, AND VULCANIZED TIRE MANUFACTURING METHOD

(71) Applicants: MITSUBISHI HEAVY INDUSTRIES MACHINERY SYSTEMS, LTD., Hyogo (JP); BRIDGESTONE CORPORATION, Tokyo (JP)

(72) Inventors: Tomoyuki Iwamoto, Kobe (JP); Hideki Fukuda, Kobe (JP); Yoshikatsu Hineno, Kobe (JP); Naoto Okudomi, Tokyo (JP); Takeshi Fukui, Tokyo (JP); Satoshi Ochiai, Tokyo (JP); Akihiko Hajikano, Tokyo (JP)

(73) Assignees: MITSUBISHI HEAVY INDUSTRIES MACHINERY SYSTEMS, LTD., Kobe (JP); BRIDGESTONE CORPORATION, Tokyo (JP)

( * ) Notice: Subject to any disclaimer, the term of this patent is extended or adjusted under 35 U.S.C. 154(b) by 457 days.

(21) Appl. No.: 17/431,623

(22) PCT Filed: Feb. 20, 2019

(86) PCT No.: PCT/JP2019/006257
§ 371 (c)(1),
(2) Date: Aug. 17, 2021

(87) PCT Pub. No.: WO2020/170353
PCT Pub. Date: Aug. 27, 2020

(65) Prior Publication Data
US 2022/0032565 A1  Feb. 3, 2022

(51) Int. Cl.
*B29D 30/06* (2006.01)
*B29C 35/02* (2006.01)
*B29D 30/00* (2006.01)

(52) U.S. Cl.
CPC ..... *B29D 30/0603* (2013.01); *B29D 30/0643* (2013.01); *B29C 35/02* (2013.01); *B29D 2030/0027* (2013.01)

(58) Field of Classification Search
CPC ............ B29D 30/0603; B29D 30/0643; B29D 2030/0027; B29C 35/02
(Continued)

(56) References Cited

U.S. PATENT DOCUMENTS

| | | | | |
|---|---|---|---|---|
| 2004/0234637 A1* | 11/2004 | Ito | .................... | B29D 30/005 425/34.1 |
| 2015/0231842 A1* | 8/2015 | Onimatsu | .......... | B29D 30/0661 425/28.1 |
| 2015/0343729 A1* | 12/2015 | Okada | .................. | B65G 47/904 425/58.1 |

FOREIGN PATENT DOCUMENTS

| | | |
|---|---|---|
| EP | 1658960 A2 | 5/2006 |
| JP | 2003089119 A | 3/2003 |

OTHER PUBLICATIONS

International Search Report and Written Opinion of International Application No. PCT/JP2019/006257 dated May 28, 2019; 13pp.

* cited by examiner

*Primary Examiner* — Nahida Sultana
*Assistant Examiner* — Lawrence D. Hohenbrink, Jr.
(74) *Attorney, Agent, or Firm* — HAUPTMAN HAM, LLP

(57) ABSTRACT

A tire vulcanization system is configured to deliver a vulcanized tire carried out from a vulcanizer by a tire conveyance device to a PCI device at a first position, and attaches an upper lid. The PCI device mounted with the upper lid is moved from the first position to a second position by a PCI moving portion. The tire conveyance device is configured to (Continued)

receive the raw tire disposed above the PCI device moved to the second position and carry the raw tire into the vulcanizer.

8 Claims, 11 Drawing Sheets

(58) Field of Classification Search
USPC .......................................................... 264/236
See application file for complete search history.

TIRE VULCANIZATION SYSTEM, AND VULCANIZED TIRE MANUFACTURING METHOD

RELATED APPLICATIONS

The present application is a National Phase of International Application Number PCT/JP2019/006257 filed Feb. 20, 2019.

TECHNICAL FIELD

The present invention relates to a tire vulcanization system, and a vulcanized tire manufacturing method.

BACKGROUND ART

In Patent Document 1, in order to improve the efficiency of vulcanization mold replacement work, a tire vulcanization system in which a tire transfer device for loading and unloading a tire is disposed on one side of a mold opening or closing station, and a mold loading or unloading device for replacing the mold is disposed on the other side of the mold opening or closing station is described.

CITATION LIST

Patent Document

[Patent Document 1]
Japanese Unexamined Patent Application, First Publication No. 2003-89119

SUMMARY OF INVENTION

Technical Problem

In the tire vulcanization system described in Patent Document 1, the room temperature changes depending on a season. Therefore, the temperature of the raw tire before vulcanization may drop too much and the quality of the vulcanized tire may fluctuate. Furthermore, since a PCI device that performs post-cure inflation and a tire placing stand are all located on one side of a vulcanizer, a layout may be overcrowded, which may hinder a delivery of the vulcanized tire to the PCI device.

An object of the present invention is to provide a vulcanization system and a vulcanized tire manufacturing method that can smoothly deliver a vulcanized tire to a PCI device while suppressing fluctuation in the quality of the vulcanized tire.

Solution to Problem

According to a first aspect of the present invention, a tire vulcanization system vulcanizes a raw tire and manufactures a vulcanized tire. The tire vulcanization system is provided with a vulcanizer, a PCI device, an attachment or detachment portion, a tire conveyance device, a PCI moving portion, and a raw tire placing stand portion. The vulcanizer performs a vulcanization process for the raw tire. The PCI device performs post-cure inflation of the vulcanized tire. The attachment or detachment portion is configured to attach or detach an upper lid of the PCI device. The tire conveyance device is configured to carry the raw tire disposed on the raw tire placing stand portion into the vulcanizer, and carry out the vulcanized tire subjected to the vulcanization process by the vulcanizer. The PCI moving portion is configured to move the PCI device between a first position where the upper lid is attached and a second position where the post-cure inflation is performed by the attachment or detachment portion. The raw tire placing stand portion is disposed above the PCI device moved to the second position, and on which the raw tire immediately before the vulcanization process is placed. The tire conveyance device is configured to deliver the vulcanized tire to the PCI device at the first position. The tire conveyance device is configured to receive the raw tire placed on the raw tire placing stand portion at the second position and carry the raw tire into the vulcanizer. The attachment or detachment portion is configured to attach or detach the upper lid to or from the PCI device at the first position. The PCI moving portion is configured to receive the vulcanized tire from the tire conveyance device. The PCI moving portion is configured to move the PCI device mounted with the upper lid from the first position to the second position.

In the first aspect, the vulcanized tire can be delivered to the PCI device at the first position, the upper lid can be attached, the PCI device can be moved to the second position by the PCI moving portion. Therefore, the post-cure inflation can be performed. Therefore, the vulcanized tire can be smoothly delivered to the PCI device. In addition, the space below the raw tire placing stand portion can be effectively used as a space for performing the post-cure inflation.

Furthermore, the heat of the vulcanized tire subjected to the post-cure inflation is transferred to the raw tire placed on the raw tire placing stand portion disposed above the vulcanized tire. Therefore, it is possible to prevent the temperature of the raw tire from dropping too much. Therefore, it is possible to prevent the quality of the vulcanized tire from fluctuating.

According to a second aspect of the present invention, the PCI moving portion according to the first aspect may move the PCI device for which the post-cure inflation is completed from the second position to the first position. The attachment or detachment portion according to the first aspect may remove the upper lid from the PCI device moved from the second position to the first position. The tire conveyance device according to the first aspect may remove the vulcanized tire from the PCI device from which the upper lid is removed by the attachment or detachment portion, and may place the vulcanized tire on a carrying-out stand for carrying out the vulcanized tire for which the post-cure inflation is completed.

With this configuration, the PCI device for which the post-cure inflation is completed can be moved from the second position to the first position, the upper lid can be removed, and the vulcanized tire can be carried out to the carrying-out stand. Therefore, the vulcanized tire for which the post-cure inflation is completed can be smoothly carried out.

According to a third aspect of the present invention, the tire conveyance device according to the second aspect may take out the vulcanized tire from the vulcanizer and may deliver the vulcanized tire to the PCI device at the first position after the raw tire placed on the raw tire placing stand portion is carried into the vulcanizer.

In the third aspect, the vulcanized tire is delivered to the PCI device after the raw tire placed on the raw tire placing stand portion is carried into the vulcanizer. Therefore, the raw tire can be carried into the vulcanizer before the temperature of the raw tire drops.

According to a fourth aspect of the present invention, the tire conveyance device according to the third aspect is configured to convey a new raw tire to the raw tire placing stand portion after the vulcanized tire is delivered to the PCI device.

With this configuration, using the time when the PCI device received the vulcanized tire at the first position moves to the second position by the PCI moving portion, the new raw tire can be carried into the raw tire placing stand portion by the tire conveyance device.

According to a fifth aspect of the present invention, the tire vulcanization system according to any one of the first to fourth aspects may include two sets of PCI lines for one vulcanizer. The PCI line includes the PCI moving portion, the PCI device, and the raw tire placing stand portion. The raw tire placing stand portions of the two sets of PCI lines may be disposed on sides opposite to each other with reference to the attachment or detachment portion in a circumferential direction centered on the tire conveyance device.

In the fifth aspect, the raw tire placing stand portions are disposed on sides opposite to each other with reference to the attachment or detachment portion. Therefore, each of the first positions of the two sets of PCI lines can be set at a position where the attachment or detachment portion is disposed. Furthermore, the post-cure inflation can be performed in parallel on the two sets of PCI lines. Therefore, while providing the plurality of PCI lines, the tire conveyance device can deliver and receive the vulcanized tire at a position where the upper lid is attached or detached by the attachment or detachment portion to and from each of the PCI lines.

According to a sixth aspect of the present invention, the tire conveyance device according to the fifth aspect may alternately carry out the raw tires from the raw tire placing stand portions of the two sets of PCI lines. The tire conveyance device may further alternately carry the vulcanized tires into the PCI devices of the two sets of PCI lines.

With such a configuration, the raw tire can be smoothly carried into the vulcanizer. Furthermore, the post-cure inflation can be smoothly performed for the vulcanized tire carried out from the vulcanizer.

According to a seventh aspect of the present invention, a vulcanized tire manufacturing method vulcanizes a raw tire and manufactures a vulcanized tire. The vulcanized tire manufacturing method includes a vulcanization step, a tire conveyance mounting step, a first PCI device moving step, a PCI step, a second PCI device moving step, and a tire carrying-out step. In the vulcanization step, a vulcanization process is performed for the raw tire. In the tire conveyance mounting step, the vulcanized tire subjected to the vulcanization process is conveyed to a PCI device disposed at a first position and an upper lid is mounted. In the first PCI device moving step, the PCI device on which the vulcanized tire is mounted is moved from the first position to a second position. In the PCI step, post-cure inflation of the vulcanized tire is performed at the second position by the PCI device. In the second PCI device moving step, the PCI device on which the post-cure inflation is completed is moved from the second position to the first position. In the tire carrying-out step, the upper lid is removed from the PCI device at the first position and the vulcanized tire is carried out.

According to an eighth aspect of the present invention, the vulcanized tire manufacturing method according to the seventh or tenth aspect may include a heating step. In the heating step, the raw tire is heated by utilizing waste heat of the post-cure inflation in parallel with the PCI step.

Advantageous Effects of Invention

According to the tire vulcanization system and the vulcanized tire manufacturing method, it is possible to smoothly deliver the vulcanized tire to the PCI device while suppressing the fluctuation in the quality of the vulcanized tire.

DESCRIPTION OF EMBODIMENTS

Hereinafter, a tire vulcanization system and a vulcanized tire manufacturing method according to an embodiment of the present invention will be described. In the tire vulcanization system and the vulcanized tire manufacturing method of the embodiment, an unvulcanized raw tire is vulcanized to manufacture a vulcanized tire.

Figure 1:
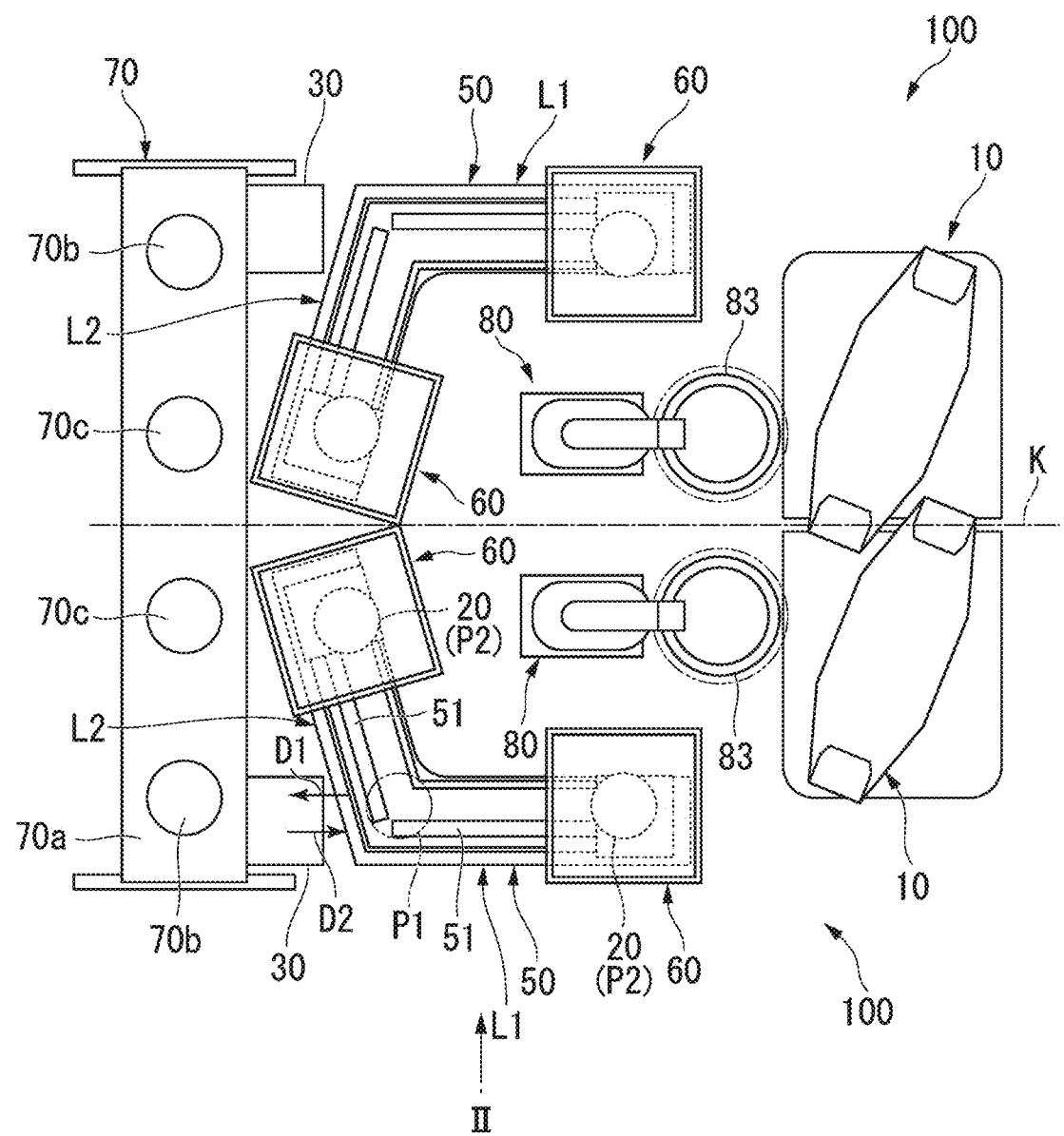
FIG. 1 is a diagram showing an overall configuration of a tire vulcanization system according to an embodiment of the present invention.
Figure 2:
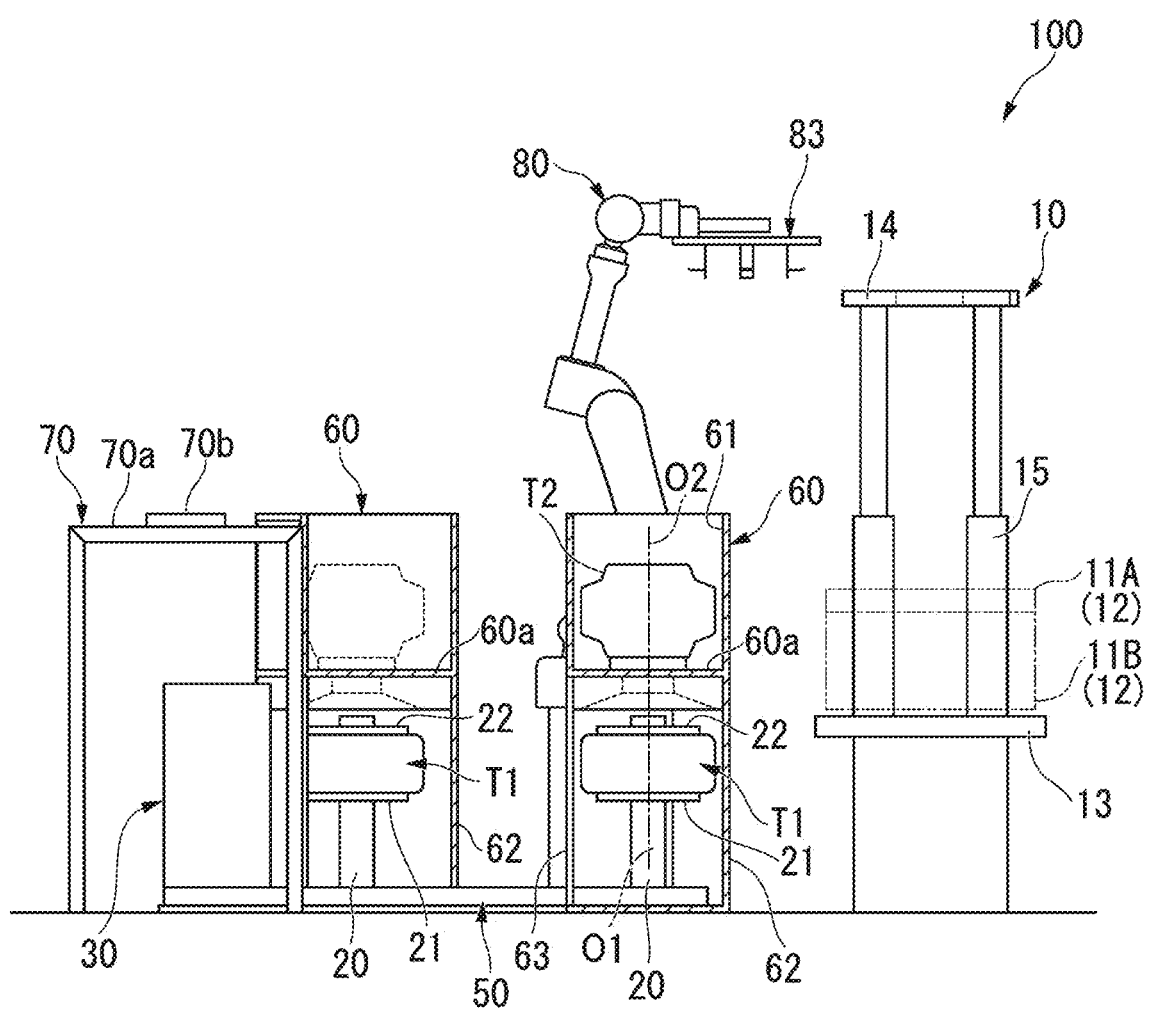
FIG. 2 is a diagram viewed from II direction of FIG. 1.

FIG. 1 is a diagram showing an overall configuration of a tire vulcanization system according to the embodiment of the present invention. FIG. 2 is a diagram viewed from II direction of FIG. 1.

As shown in FIGS. 1 and 2, in the embodiment of the present invention, a case where two tire vulcanization systems 100 are integrally provided side by side is illustrated. These two tire vulcanization systems 100 are disposed symmetrically with reference to a boundary line K except for a vulcanizer 10. Therefore, in the following description, only one of the two tire vulcanization systems 100 will be described.

The tire vulcanization system 100 is provided with a vulcanizer 10, a PCI device 20, an attachment or detachment portion 30, a PCI moving portion 50, a raw tire placing stand portion 60, a tire carrying-in or carrying-out stand 70, and a tire conveyance device 80.

As shown in FIG. 2, the vulcanizer 10 includes a mold 12 that can be opened and closed up and down. The vulcanizer 10 molds a vulcanized tire by heating and compressing the raw tire carried into the mold 12. In the embodiment, a container type mold 12 is used in an example. The mold 12 is provided with an upper mold 11A and a lower mold 11B that can be separated up and down.

The vulcanizer 10 is provided with a base portion 13, a bolster plate 14, and a cylinder 15. The base portion 13 supports the lower mold 11B from below. The bolster plate 14 supports the upper mold 11A from above. The cylinder 15 lifts and lowers the bolster plate 14. That is, the upper mold 11A can be lifted and lowered by lifting and lowering the bolster plate 14 by the cylinder 15. FIG. 2 shows a state where the bolster plate 14 and the upper mold 11A are separated from each other in order to replace the mold 12.

Figure 10:
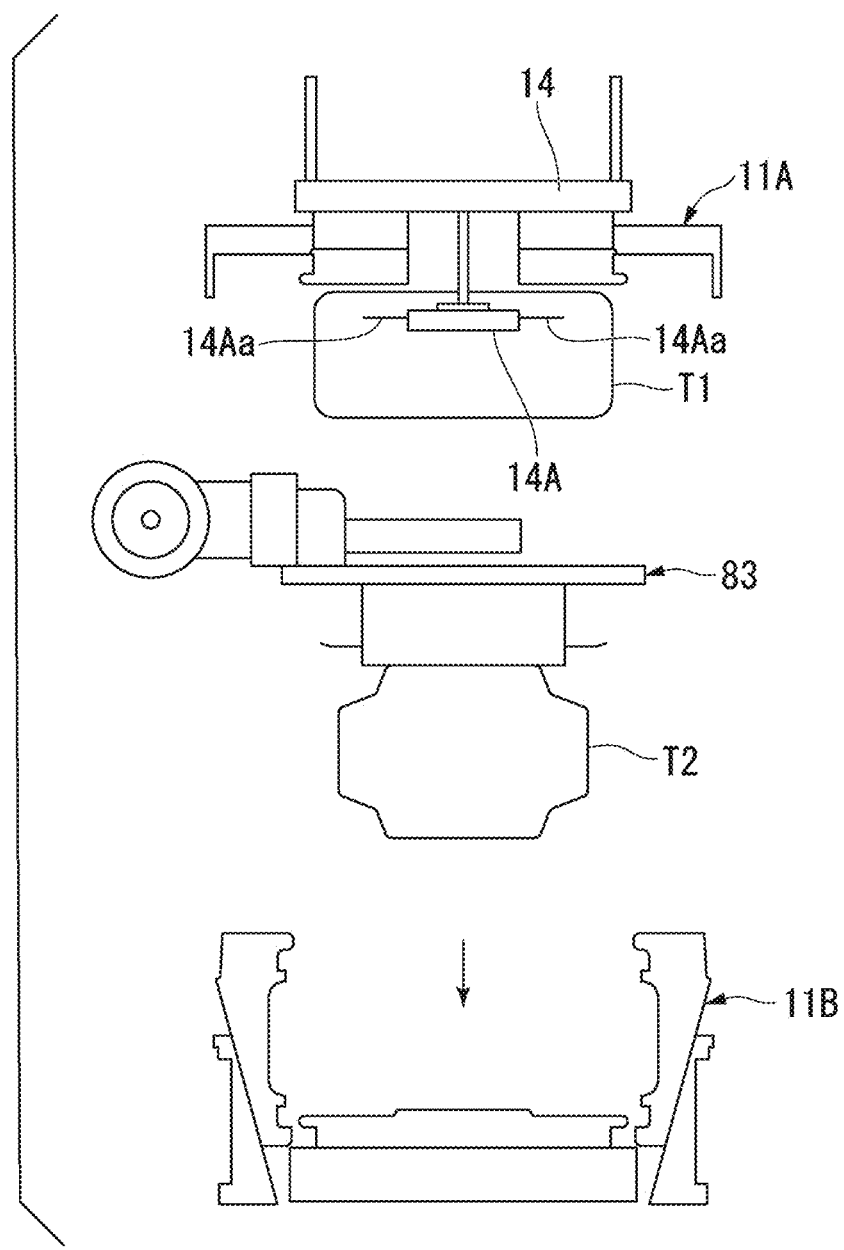
FIG. 10 is a side view showing a step of carrying a raw tire into a lower mold by the hand portion according to the embodiment of the present invention.
Figure 11:
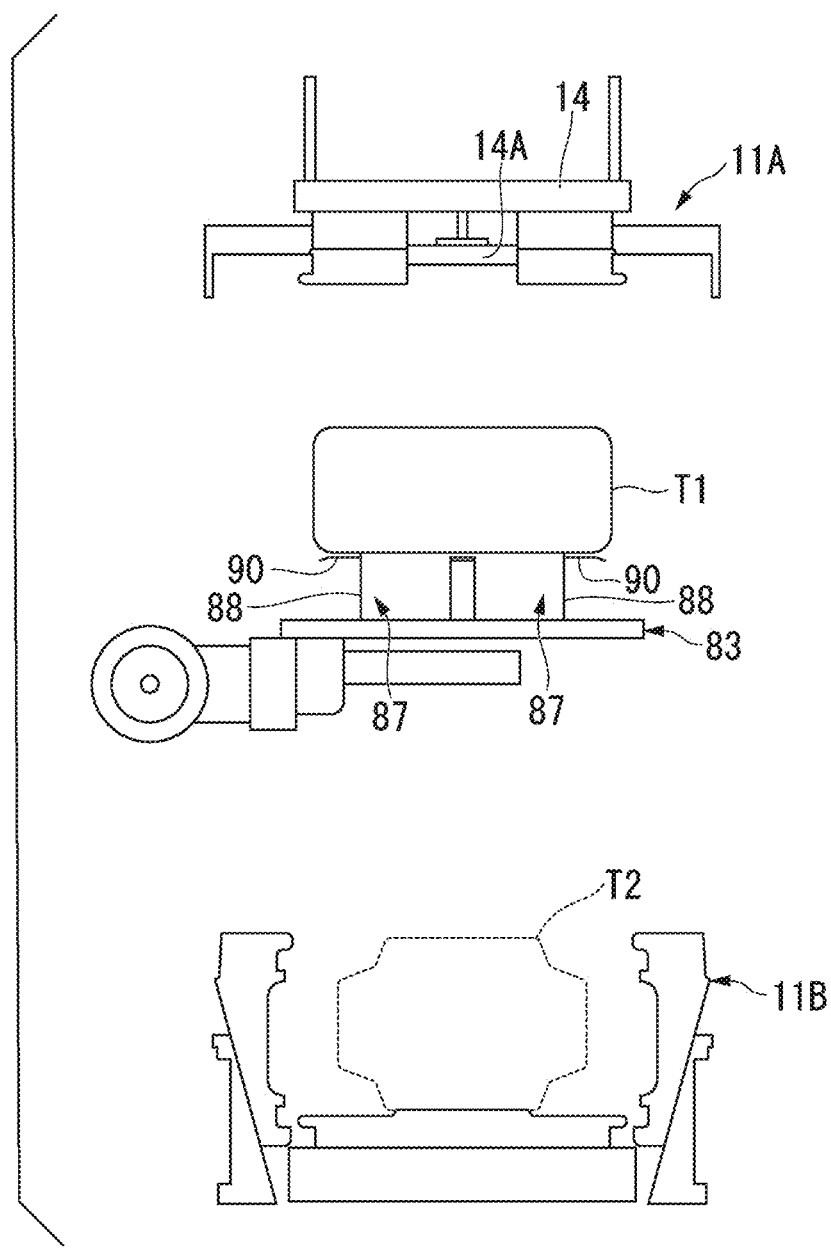
FIG. 11 is a side view showing a step of carrying out a vulcanized tire from an upper mold by the hand portion according to the embodiment of the present invention.

When the mold 12 of the vulcanizer 10 is opened, a tread mold (not shown) for forming a tread portion of the vulcanized tire remains in the lower mold 11B. When the mold 12 of the vulcanizer 10 is opened, an upper sidewall mold (not shown) for forming an upper sidewall of the vulcanized tire is further raised together with the bolster plate 14. In the center of the bolster plate 14, a hanging portion 14A (refer to FIG. 10; described later) capable of hanging a vulcanized tire T1 is provided. By the hanging portion 14A, the vulcanized tire T1 can be raised together with the bolster plate 14 when the mold 12 is opened. In FIGS. 10 and 11, for convenience of illustration, the tread mold and the sidewall mold are omitted.

The hanging portion 14A in the embodiment descends in the axial direction of the vulcanized tire T1 between an upper bead and a lower bead of the vulcanized tire T1.

The hanging portion 14A swings and deploys a locking piece 14Aa stored inside the hanging portion 14A. As a result, the locking piece 14Aa expands than the bead diameter. Therefore, by raising the hanging portion 14A, the locking piece 14Aa is caught around the upper bead of the vulcanized tire T1 and the vulcanized tire T1 can be hung. The hanging portion 14A may have any configuration as long as the vulcanized tire T1 can be raised together with the upper mold 11A.

The PCI device 20 performs post-cure inflation (hereinafter, simply referred to as PCI process) of the vulcanized tire T1. Specifically, the vulcanized tire T1 in a high temperature state after vulcanization is cooled in a state where pressure is applied to the inside thereof. As shown in FIG. 2, the PCI device 20 in the embodiment performs PCI process in a posture in which an axis O1 of the vulcanized tire T1 extends in the vertical direction. In the embodiment, two PCI devices 20 are provided for one tire vulcanization system 100. Each of these PCI devices 20 is provided independently and has a device (not shown) for supplying compressed air to the inside of the vulcanized tire T1. The PCI device 20 is provided with a lower rim 21 and an upper rim (upper lid) 22, and closes each of upper and lower beads of the vulcanized tire T1. When attaching or detaching the vulcanized tire T1, the upper rim 22 is removed. Each of these PCI devices 20 can be moved in the horizontal direction by the PCI moving portion 50.

The attachment or detachment portion 30 attaches or detaches the upper rim 22 from the PCI device 20. In the embodiment, one attachment or detachment portion 30 is provided for one tire vulcanization system 100. The attachment or detachment portion 30 attaches or detaches the upper rim 22 to or from the PCI device 20 disposed at a first position P1 (refer to FIG. 1) for attaching or detaching the upper rim 22. The attachment or detachment portion 30 moves and holds the upper rim 22 removed when the vulcanized tire T1 is carried out from the PCI device 20 in the direction D1 away from the vulcanizer 10. On the other hand, when the vulcanized tire T1 is attached to the PCI device 20, the attachment or detachment portion 30 moves the upper rim 22 in the direction D2 approaching the vulcanizer 10 in the direction opposite to the direction D1 and mounts the upper rim 22 on the PCI device 20. As a result, the PCI device 20 is in a state where the PCI process for the vulcanized tire T1 can be performed.

The PCI moving portion 50 moves the PCI device 20 between the first position P1 where the upper rim 22 is attached by the attachment or detachment portion 30 and a second position P2 where the PCI process is performed. Here, in the embodiment, at the first position P1 where the upper rim 22 is attached, the vulcanized tire T1 is mounted on the PCI device 20 and the upper rim 22 is attached.

The PCI moving portion 50 moves the PCI device 20 for which the PCI process of the vulcanized tire T1 is completed from the second position P2 to the first position P1. Here, the above-described attachment or detachment portion 30 removes the upper rim 22 from the PCI device 20 moved to the first position P1. The PCI moving portion 50 in the embodiment can use an actuator such as a rodless cylinder. The PCI moving portion 50 is provided with a tube 51 that guides the PCI device 20 between the first position P1 and the second position P2.

The raw tire placing stand portion 60 is disposed above the PCI device 20 moved to the second position P2. In other words, the above-described PCI process is performed in the space below the raw tire placing stand portion 60. The raw tire placing stand portion 60 is formed so that the raw tire T2 immediately before the vulcanization process can be placed. The raw tire T2 is placed on the raw tire placing stand portion 60 in the embodiment in a posture in which the axis O2 extends in the vertical direction.

The raw tire placing stand portion 60 in the embodiment is formed in a box shape having an upper opening 61 that opens upward. The raw tire placing stand portion 60 is supported from below by the leg portion 62. The leg portion 62 of the embodiment is formed in a box shape surrounding the PCI device 20 disposed at the second position P2, and includes an opening portion 63 on the side close to the first position P1. Through the opening portion 63, the PCI device 20 moves between the first position P1 and the second position P2.

The raw tire placing stand portion 60 in the embodiment is configured to transfer the waste heat of the PCI process by the PCI device 20 disposed below the raw tire placing stand portion 60 to the raw tire T2 placed on the raw tire placing stand portion 60. As a result, even in a case where the room temperature of the place where the tire vulcanization system 100 is installed is low, it is possible to prevent the temperature of the raw tire T2 from being too low.

As shown in FIG. 1, one tire vulcanization system 100 is provided with two sets of PCI lines L1 and L2. Each of these PCI lines L1 and L2 includes one PCI device 20, one PCI moving portion 50, and one raw tire placing stand portion 60. In the plan view of FIG. 1, each of the raw tire placing stand portions 60 provided with the two sets of PCI lines L1 and L2 is disposed on sides opposite to each other with reference to the position of the attachment or detachment portion 30 (in other words, first position P1) in the circumferential direction centered on the tire conveyance device 80. In the embodiment, the case where the PCI line L1 extends parallel to the boundary line K, and the PCI line L2 extends in the direction intersecting the boundary line K, and the PCI line L1 and the PCI line L2 are disposed in an L shape in a plan view is illustrated.

The tire carrying-in or carrying-out stand 70 is formed so that the raw tire T2 carried into the tire vulcanization system 100 and the vulcanized tire T1 carried out from the tire vulcanization system 100 can be temporarily placed. The tire carrying-in or carrying-out stand 70 is disposed in the tire vulcanization system 100 at the position farthest from the vulcanizer 10 in the direction where the boundary line K extends. The tire carrying-in or carrying-out stand 70 of the two tire vulcanization systems 100 in the embodiment are integrally formed.

The tire carrying-in or carrying-out stand 70 includes a placing surface 70a on which the raw tire T2 and the vulcanized tire T1 can be placed above a placing surface 60a of the raw tire placing stand portion 60. The placing surface 70a extends in a direction perpendicular to the boundary line K in a plan view, and two vulcanized tire placing portions 70b and two raw tire placing portions 70c are provided at intervals in the extending direction of the placing surface 70a. Although the case where the raw tire placing portion 70c is disposed outside the vulcanized tire placing portion 70b in the extending direction of the placing surface 70a is illustrated, the embodiment is not limited thereto.

The above-described attachment or detachment portion 30 is disposed in the space below the tire carrying-in or carrying-out stand 70 in the embodiment.

The tire conveyance device 80 carries the raw tire T2 disposed on the raw tire placing stand portion 60 into the vulcanizer 10, and also carries the vulcanized tire T1 subjected to the vulcanization process by the vulcanizer 10. Specifically, the tire conveyance device 80 delivers the vulcanized tire T1 carried out from the vulcanizer 10 to the PCI device 20 at the first position P1. Further, the tire conveyance device 80 receives the raw tire T2 placed on the raw tire placing stand portion 60 at the second position P2 and carries the raw tire T2 into the vulcanizer 10. The tire conveyance device 80 in the embodiment includes a so-called robot arm.

The tire conveyance device 80 removes the vulcanized tire T1 for which the PCI process is completed from the PCI device 20 from which the upper rim 22 is removed by the attachment or detachment portion 30, and places the vulcanized tire T1 on the vulcanized tire placing portion 70b of the tire carrying-in or carrying-out stand 70.

The tire conveyance device 80 conveys the new raw tire T2 to the raw tire placing stand portion 60 of the PCI line L1 or the PCI line L2 after delivering the vulcanized tire T1 to the PCI device 20. Here, the new raw tire T2 is sequentially replenished from the outside of the tire vulcanization system 100 to the raw tire placing portion 70c of the tire carrying-in or carrying-out stand 70. On the other hand, the vulcanized tire T1 placed on the vulcanized tire placing portion 70b of the tire carrying-in or carrying-out stand 70 is sequentially carried out to the outside of the tire vulcanization system 100.

The tire vulcanization system 100 of the embodiment has a configuration in which two sets of PCI lines L1 and L2 are provided for one tire conveyance device 80. Therefore, the tire conveyance device 80 is adapted to alternately carry out the raw tires T2 from the two raw tire placing stand portions 60 of the two sets of PCI lines L1 and L2, and alternately carry the vulcanized tire T1 into the two PCI devices 20 of the two sets of PCI lines L1 and L2.

Figure 3:
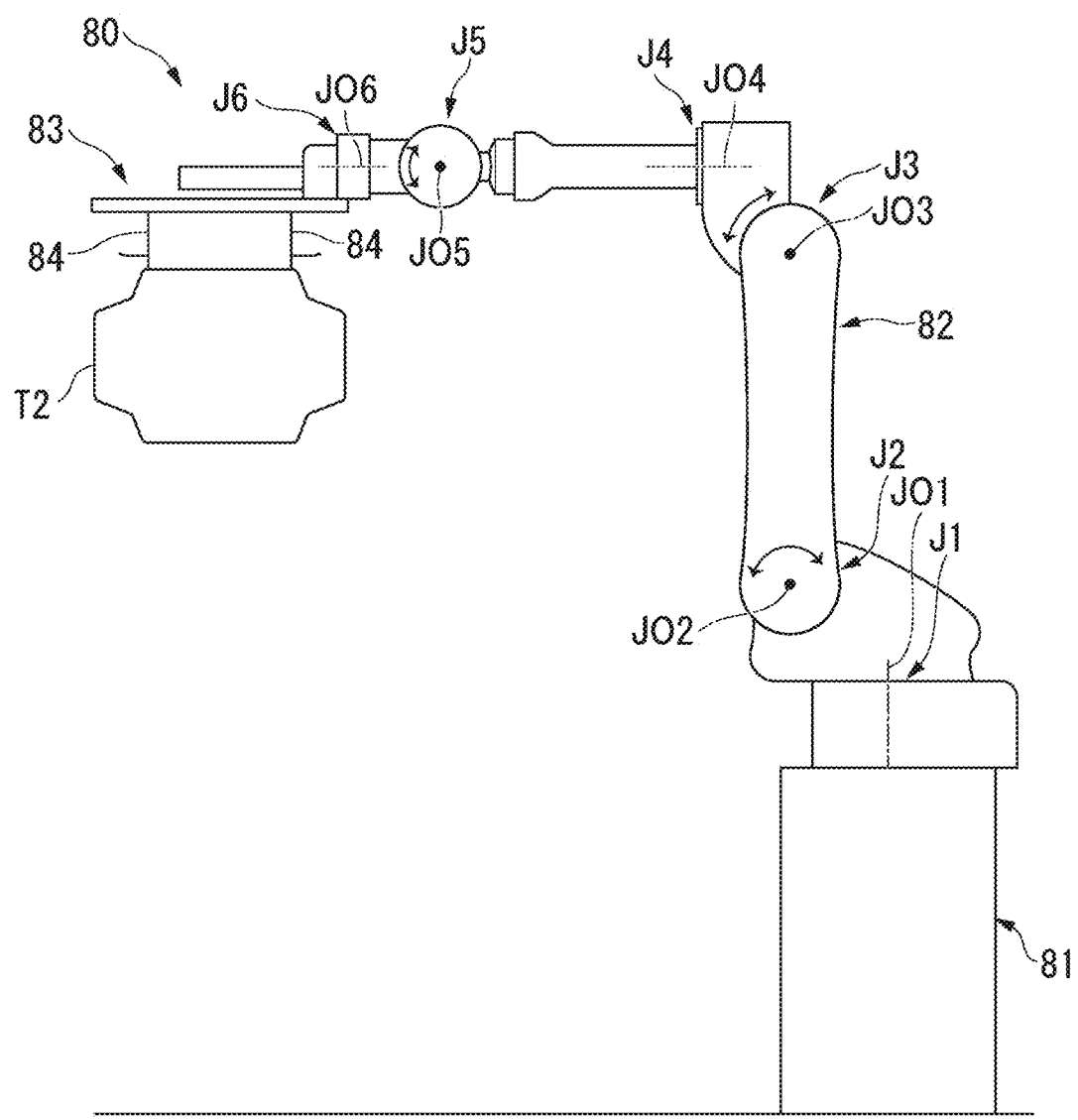
FIG. 3 is a diagram showing a schematic configuration of a tire conveyance device according to the embodiment of the present invention.

FIG. 3 is a diagram showing a schematic configuration of the tire conveyance device according to the embodiment of the present invention.

The tire conveyance device 80 illustrated in the embodiment has a configuration similar to that of a normal robot arm. As shown in FIG. 3, the tire conveyance device 80 is provided with a base portion 81, an arm portion 82, and a hand portion 83.

The arm portion 82 is supported by the base portion 81 and includes a first joint portion J1 to a sixth joint portion J6 each of which can rotate or swing around a first axis JO1 to a sixth axis JO6. The arm portion 82 can move the hand portion 83 and can hold the hand portion 83 in various postures by operating each of the first joint portion J1 to the sixth joint portion J6 by a plurality of actuators (not shown). In addition, the sixth joint portion J6 (rotation mechanism) between the arm portion 82 and the hand portion 83 can be turned at least upside down by rotating the hand portion 83 around the sixth axis JO6. Although the case where the arm portion 82 has six axes from the first axis JO1 to the sixth axis JO6 is described as an example, the arm portion 82 may have six axes or more.

Each of the above-described vulcanizer 10, the first position P1, and the second position P2 are disposed side by side in the circumferential direction centered on the base portion 81 of the tire conveyance device 80 in one tire vulcanization system 100 shown in FIG. 1.

Figure 4:
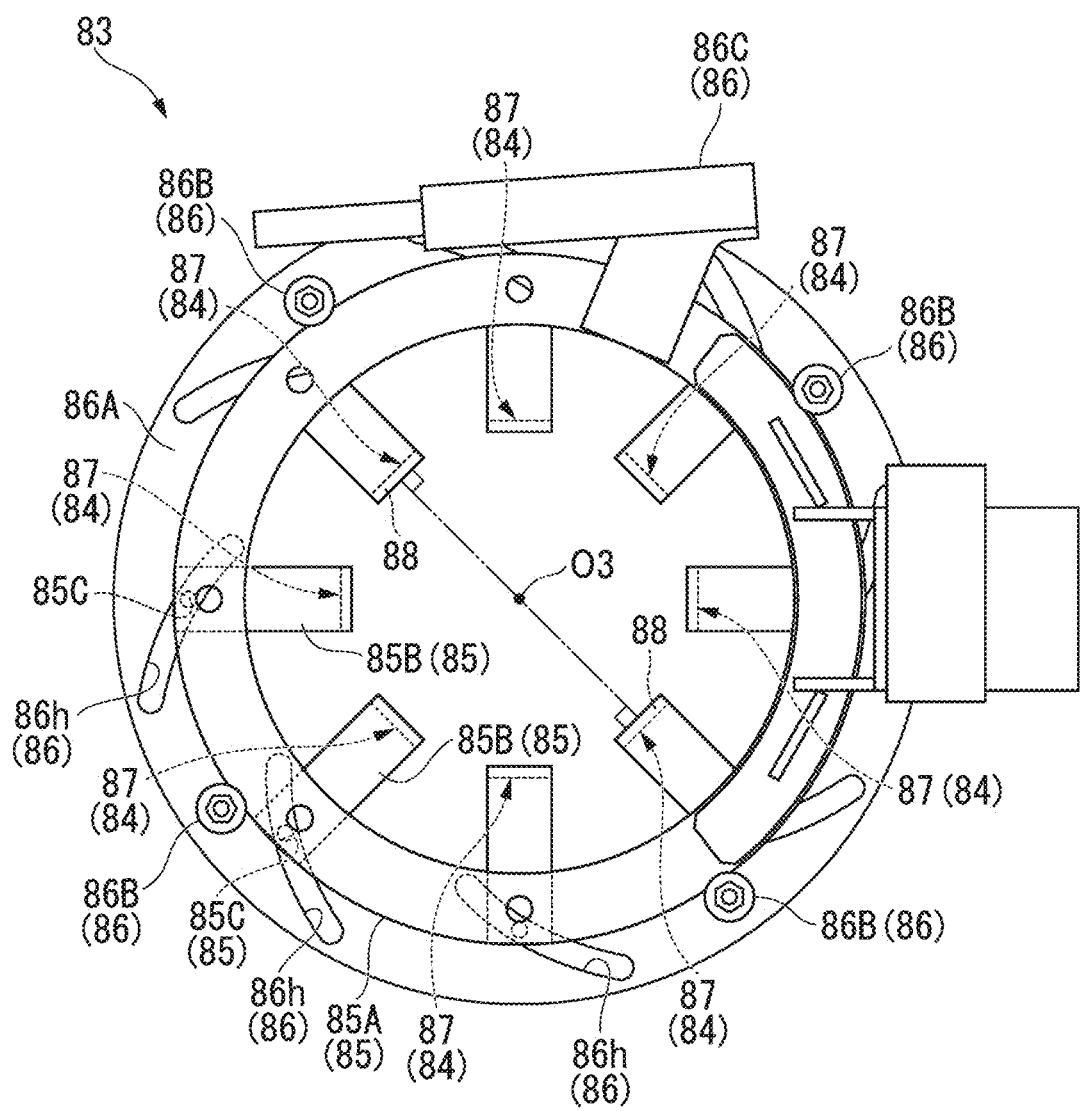
FIG. 4 is a plan view of a hand portion according to the embodiment of the present invention.
Figure 5:
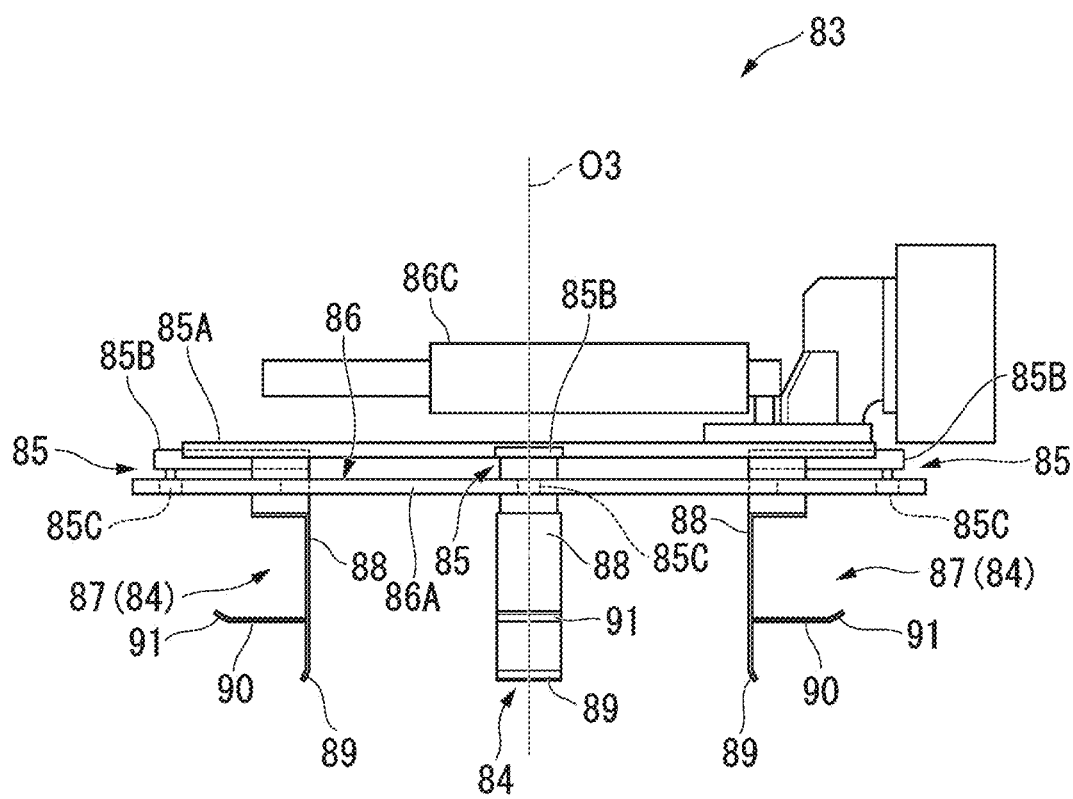
FIG. 5 is a side view of the hand portion according to the embodiment of the present invention.

FIG. 4 is a plan view of the hand portion according to the embodiment of the present invention. FIG. 5 is a side view of the hand portion according to the embodiment of the present invention.

As shown in FIGS. 3 to 5, the hand portion 83 is configured to be able to grip each bead of the raw tire T2 and the vulcanized tire T1. The hand portion 83 is provided with a gripping mechanism 84, a radial adjustment portion 85, and a movement mechanism 86. The hand portion 83 may be provided with a detection device (not shown) for detecting the vulcanized tire T1 and the raw tire T2 to be gripped.

The gripping mechanism 84 is provided with a plurality of gripping portions 87 disposed in an annular shape. The gripping mechanism 84 is configured so that each of the beads of the raw tire T2 and the vulcanized tire T1 can be gripped from the inner peripheral side by the plurality of gripping portions 87.

As shown in FIG. 5, the gripping portion 87 is provided with a base 88, an engagement claw 89, and an outer surface support portion 90.

The base 88 projects from the radial adjustment portion 85 and extends. Specifically, the base 88 projects from the radial adjustment portion 85 in the same direction (downward in FIG. 5) along the central axis O3 of the gripping mechanism 84. The base 88 in the embodiment is formed in a flat plate shape (in other words, strip shape) extending in the vertical direction. In the plan view shown in FIG. 4, each of the centers of the bases 88 in the width direction is disposed on the same virtual circle centered on the central axis O3. In the plan view of FIG. 4, these bases 88 extend in the tangential direction of the above virtual circle.

As shown in FIG. 5, the engagement claw 89 is provided at a tip end of the base 88. The engagement claw 89 is formed so as to be engaged with the beads of the raw tire T2 and the vulcanized tire T1. The engagement claw 89 can be engaged with any one of the pair of beads each disposed in the tire width direction from the inside in the tire width direction. The engagement claw 89 in the embodiment is formed so as to be inclined with respect to the base 88. Specifically, each of the engagement claws 89 is inclined so as to be disposed radially outward centered on the central axis O3 in the extending direction of the central axis O3 as the engagement claw 89 is separated from the base 88 (in other words, movement mechanism 86).

An outer surface support portion 90 supports the outer surfaces in the width direction (in other words, portions including the sidewall) of the raw tire T2 and the vulcanized tire T1. The outer surface support portion 90 is disposed closer to the base end of the base 88 from the engagement claw 89. The outer surface support portion 90 projects from the base 88 toward the outside in the radial direction centered on the central axis O3. The outer surface support portion 90 is provided with an inclined portion 91 at the tip end thereof. The inclined portion 91 is inclined so as to approach the movement mechanism 86 in the central axis O3 direction toward the tip end.

The outer surface support portion 90 in the embodiment is formed in a flat plate shape having a width dimension equivalent to that of the base 88. In the embodiment, in a case where the hand portion 83 is in a posture in which the engagement claw 89 is disposed at the uppermost position (in a posture in which the hand portion 83 in FIG. 5 is turned upside down), the outer surface support portion 90 can support the outer surface on the lower side of the vulcanized tire T1 in the width direction from below (refer to FIG. 11). At this time, the base 88 is in a state of being inserted inside the bead in the radial direction.

The radial adjustment portion 85 slidably supports the plurality of gripping portions 87 in the radial direction of the raw tire T2 and the vulcanized tire T1.

As shown in FIG. 4, the radial adjustment portion 85 is provided with a first ring member 85A and a plurality of slide blocks 85B.

The first ring member 85A is formed in a ring shape centered on the central axis O3. The first ring member 85A slidably supports the slide block 85B in the radial direction centered on the central axis O3. In the example shown in FIG. 5, the slide block 85B is slidably guided by a recessed groove formed in the first ring member 85A (refer to FIG. 5).

The plurality of slide blocks 85B are formed in a rectangular shape in a plan view extending in the radial direction centered on the central axis O3. The above-described base 88 extends from the radial inner end portion of these slide blocks 85B. Each of these slide blocks 85B is provided with a cam follower portion 85C projecting on the side opposite to the first ring member 85A in the central axis O3 direction.

The movement mechanism 86 moves the gripping mechanism 84. Specifically, the movement mechanism 86 displaces the gripping mechanism 84 in the radial direction centered on the central axis O3. As shown in FIGS. 4 and 5, the movement mechanism 86 is provided with a second ring member 86A, a plurality of roller portions 86B, and an actuator 86C.

The second ring member 86A is formed in a ring shape having a diameter larger than that of the first ring member 85A described above. The second ring member 86A is provided with a plurality of slide holes 86h for guiding the cam follower portion 85C described above. The slide hole 86h in the embodiment extends in the circumferential direction around the central axis O3 so as to be disposed radially outward from one side toward the other. The slide hole 86h in the embodiment extends in an arc shape in which the inside in the radial direction is slightly recessed.

The roller portion 86B is provided so as to project from the second ring member 86A toward the first ring member 85A in the central axis O3 direction. These roller portions 86B are rotatably formed around a central axis extending in the central axis O3 direction. Each of these roller portions 86B regulates the relative displacement of the outer peripheral edge of the first ring member 85A in the central axis O3 direction with respect to the second ring member 86A while allowing rotation around the central axis O3.

The actuator 86C rotates the second ring member 86A relative to the first ring member 85A around the central axis O3. The actuator 86C includes, for example, a hydraulic cylinder, an air cylinder, or the like. One end portion of both end portions of the actuator 86C in the length direction is connected to the first ring member 85A, and the other end portion is connected to the second ring member 86A.

That is, according to the hand portion 83 provided with the above-described configuration, by expanding and contracting the actuator 86C, the first ring member 85A can be relatively rotated around the central axis O3 with respect to the second ring member 86A. By rotating the first ring member 85A relative to the second ring member 86A in this manner, the cam follower portion 85C moves along the slide hole 86h. As a result, the slide block 85B moves in the radial direction centered on the central axis O3, and the gripping portion 87 moves in the radial direction centered on the central axis O3.

When gripping the raw tire T2 and the vulcanized tire T1 from above by the gripping mechanism 84, for example, the engagement claw 89 of the gripping portion 87 may be disposed between the pair of beads in the central axis O3 direction, and the gripping portion 87 may be moved outward in the radial direction. In this manner, the base 88 is brought into contact with the inner circumference of the bead. As a result, when the hand portion 83 is raised, the engagement claw 89 engages with the inner circumference of the bead, and the raw tire T2 and the vulcanized tire T1 can be lifted and conveyed.

On the other hand, when the vulcanized tire T1 is received from below by the gripping mechanism 84, for example, the engagement claw 89 is inserted inside the bead in the radial direction, and the outer surface in the width direction on the lower side of the vulcanized tire T1 is brought into contact with the outer surface support portion 90. The gripping portion 87 may be moved outward in the radial direction so that the base 88 is brought into contact with an inner peripheral edge of the bead. As a result, the vulcanized tire T1 can be supported and conveyed from below.

In addition, when the hand portion 83 is turned upside down around the sixth axis JO6 while the vulcanized tire T1 is supported from below by the gripping mechanism 84, the vulcanized tire T1 can be gripped from above. Although the case where the vulcanized tire T1 is supported from below by the gripping mechanism 84 is described, the gripping mechanism 84 may support the vulcanized tire T2 from below when the raw tire T2 is conveyed.

(Operation of Vulcanization System)

The tire vulcanization system 100 of the embodiment has the above-described configuration. Next, a vulcanized tire manufacturing method, which is an operation of the tire vulcanization system 100 in the embodiment, will be described with reference to the drawings.

The operation of the tire vulcanization system 100 in the embodiment is automatically controlled by a control device (not shown). In the description of the vulcanized tire manufacturing method, the vulcanization process by the vulcanizer 10 is completed and the vulcanization process is started from the state where the mold of the vulcanizer 10 is opened, and the starting position is not limited thereto. In the description of the vulcanized tire manufacturing method, only the operation of one tire vulcanization system 100 of the two sets of tire vulcanization systems 100 will be further described. In these two sets of tire vulcanization systems 100, for example, the same step may be performed at the same time, or the step having a large peak of power consumption may be performed by shifting each other.

Figure 6:
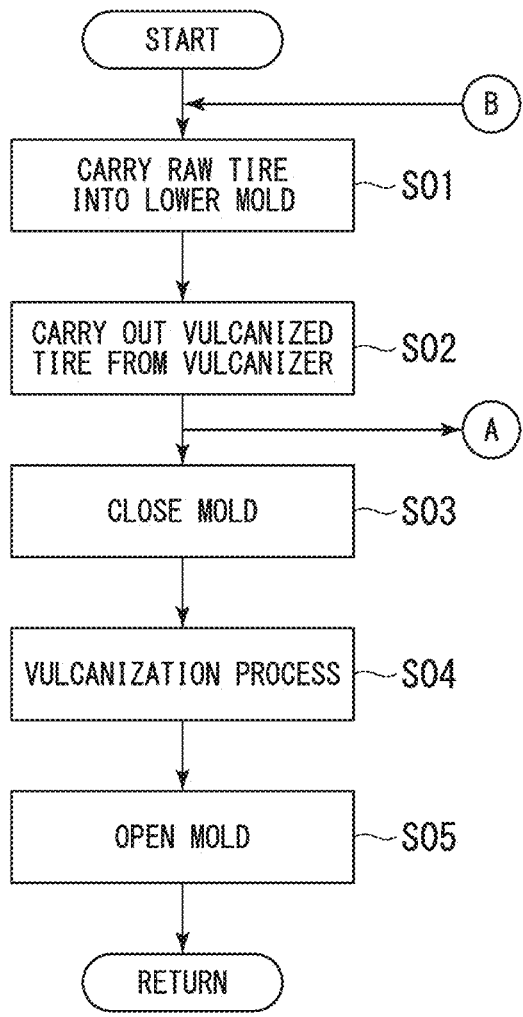
FIG. 6 is a flowchart of a vulcanized tire manufacturing method according to the embodiment of the present invention.
Figure 7:
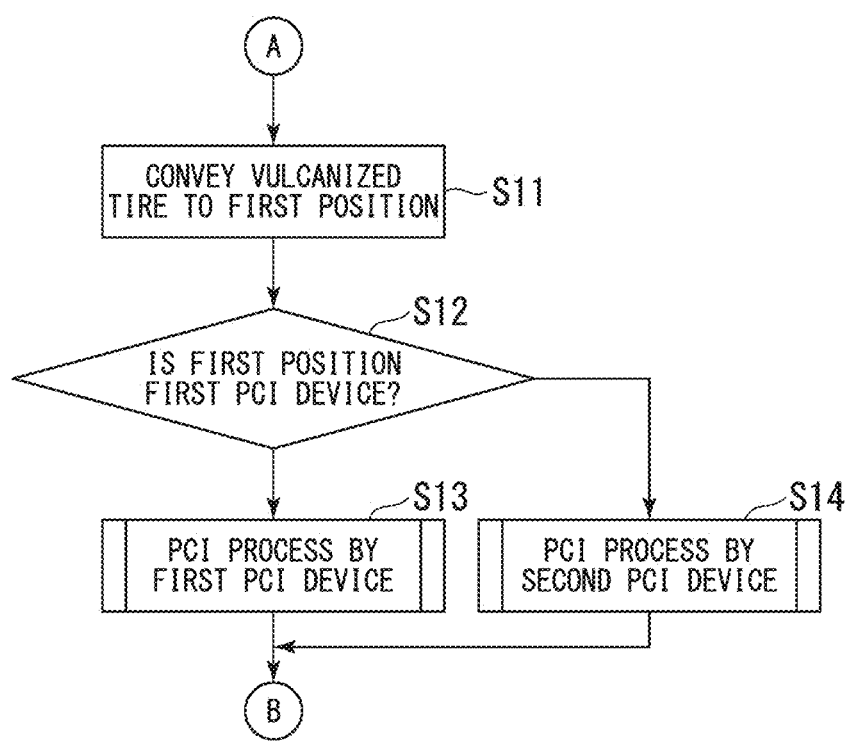
FIG. 7 is a flowchart of a PCI process performed in parallel with a vulcanization process of FIG. 6.
Figure 8:
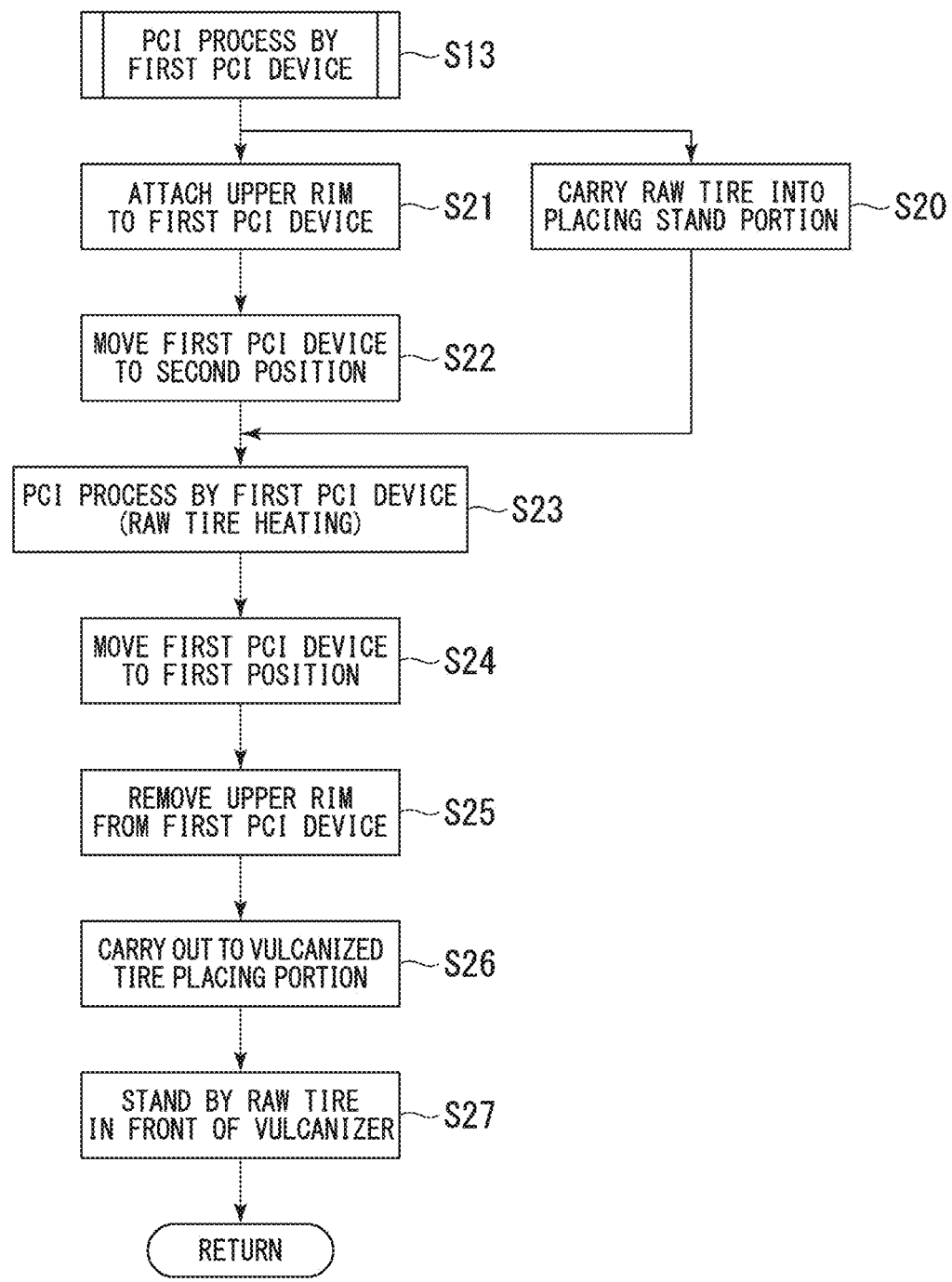
FIG. 8 is a flowchart of a subroutine of the PCI process performed by a first PCI device of FIG. 7.
Figure 9:
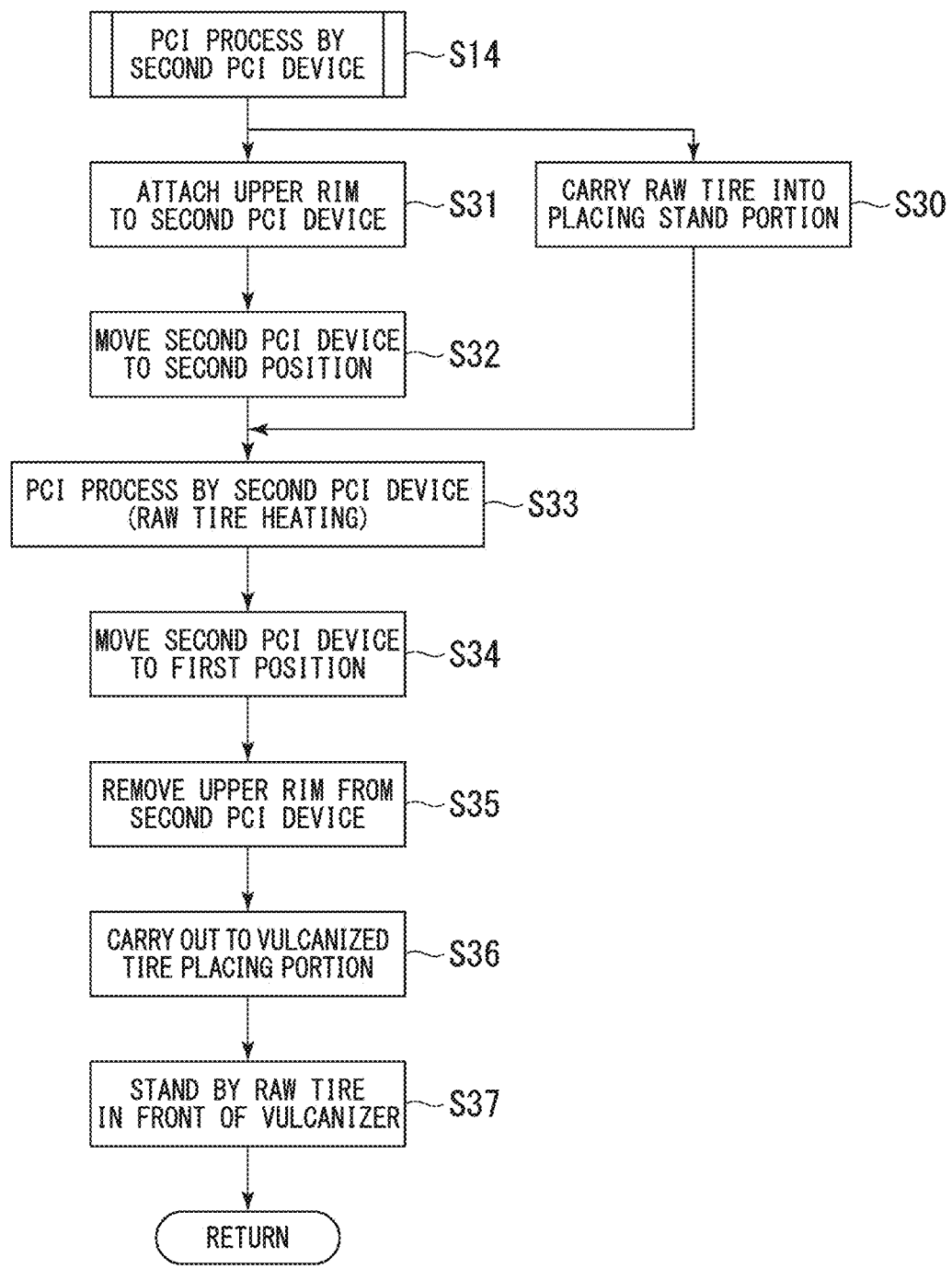
FIG. 9 is a flowchart of a subroutine of the PCI process performed by a second PCI device of FIG. 7.

FIG. 6 is the flowchart of a vulcanized tire manufacturing method according to the embodiment of the present invention. FIG. 7 is a flowchart of the PCI process performed in parallel with the vulcanization process of FIG. 6. FIG. 8 is a flowchart of a subroutine of the PCI process performed by the first PCI device of FIG. 7. FIG. 9 is a flowchart of the subroutine of the PCI process performed by the second PCI device of FIG. 7. FIG. 10 is a side view showing a step of carrying the raw tire into the lower mold by the hand portion according to the embodiment of the present invention. FIG. 11 is a side view showing a step of carrying out the vulcanized tire from the upper mold in the hand portion according to the embodiment of the present invention.

First, immediately before the mold of the vulcanizer 10 is opened, the raw tire T2 to be subjected to the vulcanization process next stands by in the vicinity of the vulcanizer 10 by the tire conveyance device 80.

From this state, as shown in FIG. 6, a step (Step S01) of carrying the raw tire T2 into the lower mold 11B is performed. In this step, first, the mold 12 of the vulcanizer 10 is opened. At this time, as shown in FIG. 10, the vulcanized tire T1 locked by the hanging portion 14A moves upward together with the upper mold 11A and is separated from the lower mold 11B. Next, the raw tire T2 is disposed between the vulcanized tire T1 and the lower mold 11B by the tire conveyance device 80. At this time, the hand portion 83 is in a state of gripping the raw tire T2 from above. Here, the center of the raw tire T2 and the center of the lower mold 11B are aligned with each other. Thereafter, the raw tire T2 is lowered by the tire conveyance device 80, and the raw tire T2 is carried into the lower mold 11B. The grip of the raw tire T2 by the hand portion 83 is released, and the hand portion 83 is raised.

Next, a step (Step S02) of carrying out the vulcanized tire T1 from the vulcanizer 10 is performed. In this step, first, the posture of the hand portion 83 is turned upside down. As shown in FIG. 11, the gripping mechanism 84 is inserted into the inner peripheral side of the bead of the vulcanized tire T1. Next, the grip by the hanging portion 14A is released. As a result, the outer surface support portion 90 of the gripping mechanism 84 is in a state of supporting the outer surface of the vulcanized tire T1 in the width direction from below. The radial position of the gripping portion 87 is adjusted so that the base 88 of the gripping portion 87 is in contact with the bead. Thereafter, the vulcanized tire T1 is carried out to the outside of the vulcanizer 10. The posture of the hand portion 83 may be turned upside down inside the vulcanizer 10 or outside the vulcanizer 10.

Next, a step of closing the mold 12 (Step S03) is performed. In this step, the upper mold 11A is lowered.

Thereafter, a step of performing a vulcanization process for the raw tire T2 (Step S04; vulcanization step) is performed. In this step, for example, a bladder (not shown) inserted in advance inside the raw tire T2 is inflated, and the raw tire T2 is pressurized and heated by using a heater, high temperature steam, or the like.

When the vulcanization process is completed, a step of opening the mold 12 (Step S05) is performed. In the step of opening the mold 12, the bladder (not shown) is deflated, and the vulcanized tire T1 inside the mold 12 is locked by the hanging portion 14A. The bolster plate 14 is raised to separate the vulcanized tire T1 together with the upper mold 11A upward from the lower mold 11B.

Here, the steps (Steps S03 to S05) after the step of closing the mold by the vulcanizer 10 (Step S03) are performed in parallel with the PCI process of the vulcanized tire T1 taken out from the mold 12.

As shown in FIG. 7, the tire conveyance device 80 conveys the vulcanized tire T1 carried out from the vulcanizer 10 to the first position P1 (Step S11). At this time, the tire conveyance device 80 turns the hand portion 83 upside down and prepares to deliver the vulcanized tire T1 to the PCI device 20 from above.

Here, at the first position P1, one of the PCI devices 20 of the PCI lines L1 and L2 stands by. In the following description, the PCI device 20 of the PCI line L1 will be referred to as a first PCI device 20A, and the PCI device 20 of the PCI line L2 will be referred to as a second PCI device 20B.

In the embodiment, the delivery to the first PCI device 20A and the delivery to the second PCI device 20B are alternately performed.

In a case where the PCI device 20 on standby at the first position P1 is the first PCI device 20A (Yes in Step S12), the PCI process is performed by the first PCI device 20A (Step S13), and the process returns to the main flow of the vulcanization process of FIG. 6.

On the other hand, in a case where the PCI device 20 on standby at the first position P1 is the second PCI device 20B, the PCI process is performed by the second PCI device 20B (Step S14), and the process returns to the main flow of the vulcanization process of FIG. 6.

As shown in FIG. 8, in the PCI process by the first PCI device 20A, first, the raw tire T2 is conveyed and placed on the raw tire placing stand portion 60 from the tire carrying-in or carrying-out stand 70 by the tire conveyance device 80 (Step S20). At this time, the upper rim 22 is attached to the first PCI device 20A by the tire conveyance device 80 in parallel at the same time (Step S21; tire conveyance mounting step). The first PCI device 20A is moved from the first position P1 to the second position P2 (Step S22; first PCI device moving step). The combination of Step S11 and Step S21 and the combination of Step S11 and Step S31 constitute the tire conveyance mounting step of the present invention.

Next, the PCI process is performed by the first PCI device 20A (Step S23; PCI step). At this time, at the second position P2, the raw tire T2 placed on the raw tire placing stand portion 60 above the first PCI device 20A is heated by the waste heat generated from the first PCI device 20A (heating step).

When the PCI process in the first PCI device 20A is completed, the first PCI device 20A is moved from the second position P2 to the first position P1 (Step S24; second PCI device moving step). The upper rim 22 is removed from the first PCI device 20A disposed at the first position P1 (Step S25), and the vulcanized tire T1 is carried out to the tire carrying-in or carrying-out stand 70 by the tire conveyance device 80 (Step S26: tire carrying-out step).

Thereafter, the raw tire T2 placed on the raw tire placing stand portion 60 of the PCI line L1 is conveyed to the vicinity of the vulcanizer 10 by the tire conveyance device 80 and allowed to stand by (Step S27), and the process returns to the main flow of the PCI process. The raw tire T2 on standby is immediately carried into the lower mold 11B when the mold 12 of the vulcanizer 10 is opened (Step S01).

On the other hand, in the PCI process by the second PCI device 20B, as shown in FIG. 9, the same step as the PCI process by the first PCI device 20A described above is performed. When the first PCI device 20A is disposed at the second position P2 and performs the PCI process, in the PCI process by the second PCI device 20B, the second PCI device 20B moves to the first position P1 and attaches and detaches the vulcanized tire T1. That is, the vulcanized tires T1 are alternately carried into the first PCI device 20A and the second PCI device 20B. Similarly, the carrying-out of the raw tire T2 placed on the raw tire placing stand portion 60 of the PCI line L1 and the carrying-out of the raw tire T2 placed on the raw tire placing stand portion 60 of the PCI line L2 are alternately performed.

In the PCI process by the second PCI device 20B, first, the raw tire T2 is conveyed and placed on the raw tire placing stand portion 60 from the tire carrying-in or carrying-out stand 70 by the tire conveyance device 80 (Step S30). At this time, the upper rim 22 is attached to the second PCI device 20B by the tire conveyance device 80 in parallel at the same time (Step S31). The second PCI device 20B is moved from the first position P1 to the second position P2 (Step S32).

Next, the PCI process is performed by the second PCI device 20B (Step S33). At this time, at the second position P2, the raw tire T2 placed on the raw tire placing stand portion 60 above the second PCI device 20B is heated by the waste heat generated from the second PCI device 20B (heating step).

When the PCI process in the second PCI device 20B is completed, the second PCI device 20B is moved to the first position P1 (Step S34). The upper rim 22 is removed from the second PCI device 20B disposed at the first position P1 (Step S35), and the vulcanized tire T1 is carried out to the tire carrying-in or carrying-out stand 70 by the tire conveyance device 80 (Step S36).

Thereafter, the raw tire T2 placed on the raw tire placing stand portion 60 of the PCI line L2 is conveyed to the vicinity of the vulcanizer 10 by the tire conveyance device 80 and allowed to stand by (Step S37), and the process returns to the main flow of the PCI process. The raw tire T2 on standby is immediately carried into the lower mold 11B when the mold 12 of the vulcanizer 10 is opened (Step S01).

(Action and Effect of Embodiment)

In the above-described embodiment, the vulcanized tire T1 is delivered to the PCI device 20 at the first position P1, the upper rim 22 is attached, the PCI device 20 is moved to the second position P2 by the PCI moving portion 50. Therefore, the PCI process can be performed. Therefore, the vulcanized tire T1 can be smoothly delivered to the PCI device 20. In addition, the space below the raw tire placing stand portion 60 can be effectively used as a space for performing the PCI process.

Furthermore, the heat of the vulcanized tire T1 subjected to the PCI process is transferred to the raw tire T2 placed on the raw tire placing stand portion 60 disposed above the vulcanized tire T1. Therefore, it is possible to prevent the temperature of the raw tire T2 from dropping too much. Therefore, it is possible to prevent the quality of the vulcanized tire T1 from fluctuating.

In the embodiment, the PCI device 20 for which the PCI process is completed is further moved from the second position P2 to the first position P1, and the upper rim 22 is removed, so that the vulcanized tire T1 is carried out to the tire carrying-in or carrying-out stand 70. Therefore, the vulcanized tire T1 for which the PCI process is completed can be smoothly carried out.

In the embodiment, furthermore, the vulcanized tire T1 is delivered to the PCI device 20 after the raw tire T2 placed on the raw tire placing stand portion 60 is carried into the vulcanizer 10. Therefore, the raw tire T2 can be carried into the vulcanizer before the temperature of the raw tire T2 drops.

In the embodiment, furthermore, the tire conveyance device 80 conveys the new raw tire T2 to the raw tire placing stand portion 60 of the PCI line L (L1 and L2), after delivering the vulcanized tire T1 to the PCI device 20. Therefore, using the time when the PCI device 20 received the vulcanized tire T1 at the first position P1 moves to the second position P2 by the PCI moving portion 50, the new raw tire T2 can be carried into the raw tire placing stand portion 60 by the tire conveyance device 80.

In the embodiment, the raw tire placing stand portions 60 are further disposed on sides opposite to each other with reference to the attachment or detachment portion 30. Therefore, each of the first positions P1 of the two sets of PCI lines L1 and L2 can be set at the position where the attachment or detachment portion 30 is disposed.

Furthermore, the PCI process can be performed in parallel on the two sets of PCI lines L1 and L2. Therefore, while providing the plurality of PCI lines L1 and L2, the tire conveyance device 80 can deliver and receive the vulcanized tire T1 at a position where the upper rim 22 is attached or detached by the attachment or detachment portion 30 to and from each of the PCI lines L1 and L2.

In the embodiment, the tire conveyance device 80 further causes the raw tires T2 to be alternately carried out from the raw tire placing stand portions 60 of the two sets of PCI lines L1 and L2. Furthermore, the tire conveyance device 80 causes the vulcanized tires T1 to be alternately carried into the first PCI device 20A and the second PCI device 20B of the two sets of PCI lines L1 and L2. Therefore, the raw tire T2 can be smoothly carried into the vulcanizer 10. Furthermore, the vulcanized tire T1 carried out from the vulcanizer 10 can be smoothly subjected to the PCI process.

In the embodiment, when the mold 12 is opened, the vulcanized tire T1 is further moved upward together with the upper mold 11A so as to be in a hung state. In the embodiment, in a state where the vulcanized tire T1 is hung, the raw tire T2 is further carried into the lower mold 11B by the tire conveyance device 80. In addition, the tire conveyance device 80 receives and carries the vulcanized tire T1 hung by the hanging portion 14A in a state where the raw tire T2 is carried into the lower mold 11B.

In this manner, while the mold 12 is open, it is not necessary for the tire conveyance device 80 to pick up the raw tire T2 from the raw tire placing stand portion 60, or to place the vulcanized tire T1 at the first position P1. Therefore, in one tire vulcanization system 100, the time during which the mold 12 is opened can be shortened by using one tire conveyance device 80. In addition, since one tire conveyance device 80 can be used, the tire conveyance device 80 may be disposed only on one side of the mold 12, so that a space for replacing the mold can be ensured on the other side of the mold 12, for example.

Therefore, it is possible to shorten the time for carrying out the vulcanized tire T1 from the carrying-in of the raw tire T2 while suppressing the decrease in the work efficiency of the mold replacement.

In the embodiment, the gripping portion 87 of the gripping mechanism 84 further includes an engagement claw 89. Therefore, when the raw tire T2 is gripped and conveyed from above, the posture of the raw tire T2 gripped by the gripping portion 87 can be stabilized.

Furthermore, the gripping portion 87 of the gripping mechanism 84 is provided with the outer surface support portion 90. Therefore, when the vulcanized tire T1 hung from the hanging portion 14A is received and gripped from below by the gripping mechanism 84, the outer surface in the width direction below the vulcanized tire T1 can be supported from below by the outer surface support portion 90. Therefore, it is possible to carry in the raw tire T2 and carry out the vulcanized tire T1 more stably with one gripping mechanism 84.

In the embodiment, the tire conveyance device 80 is further provided with the sixth joint portion J6. Therefore, the posture for receiving the vulcanized tire T1 can be obtained only by turning the hand portion 83 upside down by the sixth joint portion J6 after the raw tire T2 is carried into the lower mold 11B. As a result, the tire conveyance device 80 can rapidly receive the vulcanized tire T1 after the raw tire T2 is carried into the lower mold 11B. Therefore, the opening time of the mold 12 can be further shortened.

The present invention is not limited to the above-described embodiments, and includes various modifications to the above-described embodiments without departing from the gist of the present invention. That is, the specific shape, configuration, and the like shown in the embodiment are merely examples, and can be changed as appropriate.

In the above-described embodiment, the case where two sets of PCI lines are provided for one tire vulcanization system 100 is described, and the present invention is not limited to the two sets. For example, for one tire vulcanization system 100, only one set of one PCI line may be provided, or three or more sets of PCI lines may be provided.

In the above-described embodiment, the case where the raw tire T2 is heated at the second position P2 is described. However, the raw tire T2 may be heated as needed, and for example, the raw tire T2 may not be heated.

In the above-described embodiment, the case where the tire conveyance device 80 can turn the hand portion 83 upside down by the sixth joint portion J6 is described. However, the present invention is not limited to this configuration, and for example, two gripping mechanisms 84 may be provided vertically symmetrically for one hand portion 83.

In the above-described embodiment, the case where the raw tire T2 is gripped from above and the vulcanized tire T1 is supported from below by the gripping mechanism 84 having the engagement claw 89 and the outer surface support portion 90 is described. However, any structure may be used as long as the raw tire T2 and the vulcanized tire T1 can be gripped.

INDUSTRIAL APPLICABILITY

According to the tire vulcanization system and the vulcanized tire manufacturing method, it is possible to smoothly deliver the vulcanized tire to the PCI device while suppressing the fluctuation in the quality of the vulcanized tire.

What is claimed is:

1. A vulcanized tire manufacturing method for vulcanizing a raw tire and manufacturing a vulcanized tire, the method comprising:
   a vulcanization step of performing a vulcanization process for the raw tire;
   a tire conveyance mounting step of conveying the vulcanized tire subjected to the vulcanization process to a PCI device disposed at a first position and mounting an upper lid;
   a first PCI device moving step of moving the PCI device on which the vulcanized tire is mounted from the first position to a second position;
   a PCI step of performing post-cure inflation of the vulcanized tire at the second position by the PCI device;
   a second PCI device moving step of moving the PCI device on which the post-cure inflation is completed from the second position to the first position; and
   a tire carrying-out step of removing the upper lid from the PCI device at the first position and carrying out the vulcanized tire.

2. The vulcanized tire manufacturing method according to claim 1, further comprising:
   a heating step of heating the raw tire by utilizing waste heat of the post-cure inflation in parallel with the PCI step.

3. A tire vulcanization system that is configured to vulcanize a raw tire and manufactures a vulcanized tire, the system comprising:
   a vulcanizer configured to perform a vulcanization process for the raw tire;
   a PCI device configured to perform post-cure inflation of the vulcanized tire;
   an attachment or detachment portion configured to attach or detach an upper lid of the PCI device;
   a tire conveyance device configured to carry the raw tire into the vulcanizer and carry out the vulcanized tire subjected to the vulcanization process by the vulcanizer;
   a PCI moving portion configured to move the PCI device between a first position where the upper lid is attached by the attachment or detachment portion and a second position where the post-cure inflation is performed; and
   a raw tire placing stand portion disposed above the PCI device moved to the second position and on which the raw tire immediately before the vulcanization process is placed, wherein
   the tire conveyance device is configured to deliver the vulcanized tire to the PCI device at the first position, receive the raw tire placed on the raw tire placing stand portion at the second position, and carry the raw tire into the vulcanizer,
   the attachment or detachment portion is configured to attach or detach the upper lid to or from the PCI device at the first position, and
   the PCI moving portion is configured to receive the vulcanized tire from the tire conveyance device and move the PCI device mounted with the upper lid from the first position to the second position.

4. The tire vulcanization system according to claim 3, wherein
   the PCI moving portion is configured to move the PCI device on which the post-cure inflation is completed from the second position to the first position,
   the attachment or detachment portion is configured to remove the upper lid from the PCI device moved from the second position to the first position, and
   the tire conveyance device is configured to remove the vulcanized tire from the PCI device from which the upper lid is removed by the attachment or detachment portion, and place the vulcanized tire on a carrying-out stand for carrying out the vulcanized tire for which the post-cure inflation is completed.

5. The tire vulcanization system according to claim 4, wherein
   the tire conveyance device is configured to take out the vulcanized tire from the vulcanizer and deliver the vulcanized tire to the PCI device at the first position after the raw tire placed on the raw tire placing stand portion is carried into the vulcanizer.

6. The tire vulcanization system according to claim 5, wherein the tire conveyance device is configured to convey a new raw tire to the raw tire placing stand portion after the vulcanized tire is delivered to the PCI device.

7. The tire vulcanization system according to claim 3, wherein
two sets of PCI lines including the PCI moving portion, the PCI device, and the raw tire placing stand portion for one vulcanizer are provided, and
the raw tire placing stand portions of the two sets of PCI lines are disposed on sides opposite to each other with reference to the attachment or detachment portion in a circumferential direction centered on the tire conveyance device.

8. The tire vulcanization system according to claim 7, wherein
the tire conveyance device is alternately configured to carry out the raw tires from the raw tire placing stand portions of the two sets of PCI lines, and is alternately configured to carry the vulcanized tires into the PCI devices of the two sets of PCI lines.

* * * * *